United States Patent

[11] 3,590,875

| [72] | Inventor | Oren V. Northcutt |
| | | Box 176, Point, Tex. 74572 |
| [21] | Appl. No. | 882,903 |
| [22] | Filed | Dec. 8, 1969 |
| | | Division of Ser. No. 639,767, May 19, 1967, Pat. No. 3,498,186 |
| [45] | Patented | July 6, 1971 |

[54] AIR MOTOR VALVE
1 Claim, 6 Drawing Figs.

[52] U.S. Cl. .................................................. 137/630.14, 91/6, 173/169
[51] Int. Cl. .................................................. F16k 11/14
[50] Field of Search ...................................... 137/630, 630.14, 630.15; 91/6, 448, 444; 173/169

[56] References Cited
UNITED STATES PATENTS

| 1,655,729 | 1/1928 | Jones | 137/630.14 |
| 2,254,308 | 9/1941 | Nicholas | 137/630.14 |
| 2,899,935 | 8/1959 | Dalton | 137/630.14 |
| 3,347,270 | 10/1967 | Cranage | 137/630.15 |

Primary Examiner—Clarence R. Gordon
Attorney—Richards, Harris & Hubbard

ABSTRACT: An air motor including an outer casing having a three-lobed chamber defined in one end thereof which rotatably receives a cylindrical rotor. Air under pressure is fed through a suitable inlet into one end of the chamber. Two pairs of perpendicularly disposed vanes are slidably disposed in slots in the rotor and radially extend from the rotor into unoccupied outer portions of the three-lobed chamber. The vanes have relieved portions along the sides thereof to provide, along with the slots in the rotor, communication between the air inlet and the outer portions of the three-lobed chamber. Passage of air under pressure through the air inlet into the outer portions of the chamber acts upon the vanes to cause rotation of the rotor. The valve of the invention is included in the outer casing to vary the passage of air in order to control the rotation speed of the rotor.

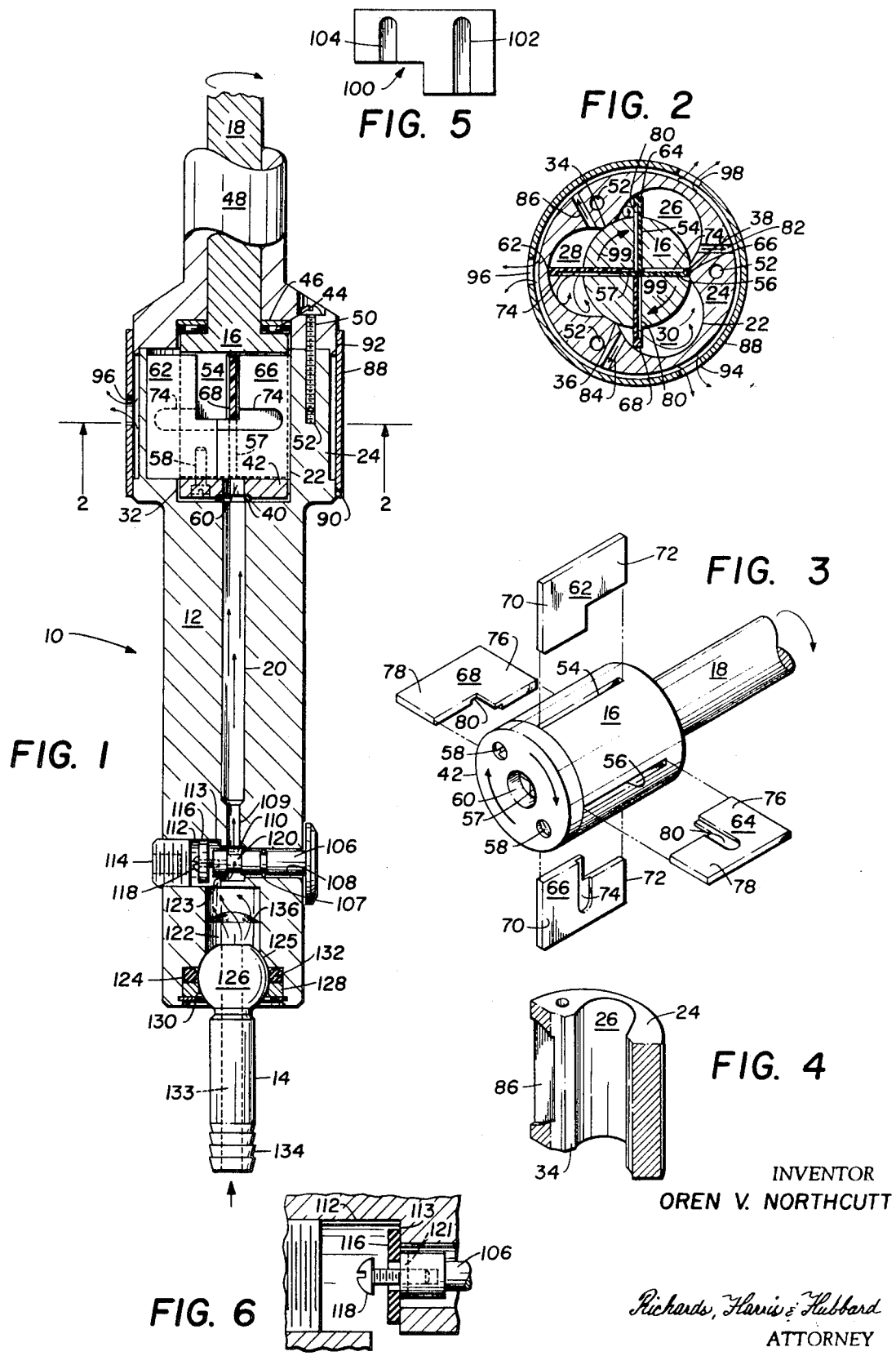

AIR MOTOR VALVE

Related Applications

This application is a divisional of application Ser. No. 639,767, filed m May 19, 1967, now U.S. Pat. No. 3,498,186, issued March 3, 1970.

BACKGROUND OF THE INVENTION

1. Field of the Invention

This invention relates to rotary air motors, and more particularly to rotary air motors in which radial vanes slidably disposed in a rotor are acted upon by air under pressure to cause rotation of the rotor.

2. Description of the Prior Art

Air motors have heretofore been developed in which a source of pressurized air is connected through a casing inlet to a casing chamber containing a rotor. Radially extending vanes are slidably disposed in the rotor so that the vanes extending from one side of the rotor are acted upon by the incoming pressurized air to cause rotation of the rotor. The air then passes through an outlet formed in the wall of the chamber. As the rotor turns, the vanes are forced radially inwardly by the sidewalls of the chamber until the vanes are again rotated to a position where the vanes are again extended to be acted upon by the incoming pressurized air.

Such rotary air motors have been found to be generally useful for powering hand tools and the like, but have often not been completely satisfactory with respect to starting torque and available output power. As a result, it has often been necessary to construct such previously developed air motors with relatively large dimensions to provide sufficient output power, thereby rendering the motors generally useless for many applications involving small working spaces or delicate work, due to the resulting bulky size and undue weight of the motors.

Further, previously developed rotary air motors which provide driving forces only to vanes on one side of a rotor have been found to stall in some instances, as for instance when the rotor becomes loaded at the instant a vane is disposed over the air outlet. Similarity such previously developed motors have often been difficult to start when a vane is adjacently disposed over the air outlet. Air motors using pressurized air to drive only vanes on one side of the rotor have also been subject to undesirable vibrations due to the unbalanced nature of such motors.

SUMMARY OF THE INVENTION

In accordance with the present invention, a rotary air motor is provided wherein pressurized air drives a rotor on three sides thereof, thus providing improved rotor balance and efficient driving force, in addition to reducing stalling of the motor. The motor comprises a casing having a three-lobed chamber formed therein and including an air inlet into the chamber. A rotor is disposed in the center portion of the chamber and two pairs of perpendicularly disposed vanes are slidably disposed in the rotor, each of the vanes adapted to radially extend from the rotor into unoccupied portions of the three lobes. Each of the vanes also includes relieved portions to provide communication between the air inlet and the outer portions of the three lobes. Passage of air under pressure through the air inlet into the outer portions of the lobes acts upon the radially extending portions of the vanes to provide rotation to the rotor.

BRIEF DESCRIPTION OF THE DRAWINGS

For a more complete understanding of the present invention and for further objects and advantages thereof, reference may now be had to the following description taken in conjunction with the accompanying drawings in which:

FIG. 1 is a cross-sectional view of the present air motor;

FIG. 2 is a sectional view taken generally along the section lines 2-2 of the air motor shown in FIG. 1;

FIG. 3 is an exploded view of the rotor and associated vane members of the motor shown in FIG. 1;

FIG. 4 is a fragmentary section of a portion of the casing shown in FIGS. 1 and 2;

FIG. 5 is a view of an alternative configuration of a vane member for use with the present invention; and FIG. 6 is an enlarged view of a portion of the air control valve shown in FIG. 1.

DESCRIPTION OF THE PREFERRED EMBODIMENT

Referring to FIG. 1, the present air motor is designated generally by the numeral 10 and includes a hollow casing 12 which has an air hose connection member 14 pivotally fastened in one end thereof. The casing 12 rotatably receives in another end a rotor 16 which is integrally connected to an output shaft 18. As will now be described in detail, the passage of air under pressure through the member 14 and the casing 12 causes rotation of the rotor 16 and the output shaft 18.

Casing 12 includes a central bore 20 which extends along the longitudinal axis of the casing and communicates at one end with a three-lobed chamber 22 defined in an enlarged diameter casing end portion 24. As best shown in FIG. 2, the three-lobed chamber 22 is defined by three symmetrically spaced counterbores designated generally as 26, 28 and 30. A central counterbore 32 (FIG. 1) has a greater depth than the counterbores 26, 28 and 30. Counterbore 32 defines three sidewall portions 34, 36 and 38, which are disposed about the outer periphery of rotor 16.

Rotor 16 comprises a cylindrical body having a slightly smaller diameter than the counterbore 32 so that the rotor may be easily rotated within the chamber 22. An O-ring seal 40 fits between the bottom end of the counterbore 32 and an end portion 42 of the rotor 16. A thrust bearing 44 and a thrust race 46 are disposed between the upper portion of the rotor 16 and a housing 48 in which the output shaft 18 is rotatably journaled. Housing 48 is connected to the enlarged diameter casing end portion 24 by suitable bolts 50 which are threadedly received by suitable holes 52 in casing end portion 24.

As shown in FIGS. 2 and 3, rotor 16 includes perpendicularly disposed slotted portions 54 and 56 which extend along longitudinal portions of the rotor and which intersect along the axis of rotation of the rotor to form an X-shaped passageway 57 through the center of the rotor. End portion 42 is connected to the rotor 16 by suitable screws 58 and includes a central opening 60 which communicates with the passageway 57 and the central bore 20 of casing 12.

The rotor 16 slidably receives in slots 54 and 56 two pairs of matching vane members 62, 64, 66 and 68. Vane members 62 and 66 are identical in construction and both include a base portion 70 and an integral extension 72 of reduced width. A relieved portion 74 is formed along one side of each of the vane members 62 and 66. Similarly, vane members 64 and 68 are constructed in a like manner and both include a base portion 76, an extension 78 of reduced width and a relieved portion 80 along one side thereof. The surfaces of each of the vane members are smooth in order to easily slide within slots 54 and 56.

As most clearly shown in FIG. 3, the matching pair of vane members 62 and 66 are slidably disposed in slot 54 with the base portions 70 disposed adjacent the end portion 42. The matching pair of vane members 64 and 68 are slidably disposed in slot 56 with the base portion 76 disposed adjacent the end of rotor 16 which is connected to the output shaft 18. When the motor is assembled, portions of the vane members extend radially outwardly from rotor 16 (FIG. 2) into the unoccupied lobed portions 26, 28 and 30 of chamber 22. A small amount of clearance is provided between the dimensions of chamber 22 and the combined widths of each pair of vane members.

As shown in FIGS. 2 and 4, the lobed portions of the chamber 22 include outlet slots 82, 84 and 86 which provide direct communication between the lobed portions and the outside atmosphere. The outlet slots are disposed on one side of the lobed portions so that the relieved portions 74 and 80 of the vane members face away from the slots during the majority of rotation in the lobed portions. FIG. 4 shows that the outlet slots may be formed in the sides of casing 12 with a circular cutting member so that the area of the outlet slots increases from a relatively small slotted portion opening into the lobed portions to a relatively large slotted portion at the outside surface of the casing 12. A muffler member 88 includes chamfered portions 90 and 92 which allows the member 88 to be fixedly connected between the casing end portions 24 and the housing 48. Muffler 88 includes three spaced holes 94, 96 and 98 for exhausting air from the outlet slots in the motor to the atmosphere.

In operation, air under high pressure, generally between 100 to 200 pounds per square inch, is supplied from a suitable source through the casing central bore 20 and through the opening 60 in the rotor 16. The O-ring 40 prevents air from leaking around the outside surface of rotor 16, and thus the air is forced through the passageway 57 in rotor 16 which is formed by the intersection of the slots 54 and 56. In the position of the rotor 16 shown in FIG. 2, air under pressure would thus be forced through the slot 54 and the relieved portion 80 of vane member 68 into the unoccupied lobed portion 30 of the chamber 22. The vane member 68 will prevent the air from exhausting through slot 84, and the resulting force provided by the pressurized air will act upon vane 68 to cause rotation of the rotor 16 in a clockwise direction illustrated by the arrows 99. After the vane member 68 rotates past outlet slot 84, the air under pressure will exhaust through the outlet slot 84 and the opening 94 in the muffler 88. A small clearance will exist between vane members 68 and 64, as the force of the air through relieved portions 80 will tend to force the vane members radially outwardly until the vane members abut the surface of chamber 22.

Simultaneously, air under pressure will be admitted through slot 56 and the relieved portion 74 of the vane 62 into the lobed portion 28. The force provided by the air under pressure will act upon vane member 62 to provide an additive force of rotation in a clockwise direction. After the vane member 62 rotates past the outlet slot 86, the air will be exhausted through outlet slot 86 and opening 96. Also, simultaneously, air under pressure will be forced through the outer slot 54 and the relieved portion 80 of the vane member 64 into the lobed portion 26, thereby acting upon the vane member 64 to provide a third additive force of rotation in a clockwise direction. Only when the vane member 64 rotates past outlet slot 82 will the air in lobed portion 26 be exhausted through slot 82 and muffler opening 98. The vane members thus act as valves to control the passage of air in the three-lobed chambers. It will be understood that at all times the pressurized air is acting upon three vane members to provide a generally balanced and efficient force to the rotor 16.

In the position of the rotor 16 illustrated in FIG. 2, the outer edge of vane member 66 abuts the wall portion 38 and air under pressure will be blocked from passing through the relieved portion 74 of vane member 66. However, after a relatively small arc of clockwise rotation by rotor 16, vane member 62 will be cammed radially inwardly by the walls of the lobed portion 28, thereby forcing the vane member 66 radially outwardly. The force of air passing through the relived portion 74 will then force vane member 66 against the walls of the lobed portion 30, leaving a small clearance between the edges of vane members 62 and 66.

Similarly, upon clockwise rotation of the rotor 16 from the position illustrated in FIG. 2, the vane member 68 will be cammed radially inwardly by the walls of the lobed portion 30, thereby forcing the vane member 64 further radially outwardly. Such action will continue until the vane member 68 is in substantial engagement with the wall portion 36, thereby blocking the passage of pressurized air through the relived portion 80 thereof. It will thus be understood that similar sliding movements of the vane members will occur during each revolution of the rotor 16, with air under pressure acting upon three vane members during the majority of each revolution. Such consistent driving action against three vanes causes very efficient and powerful rotative forces to be imposed upon the rotor 16 and the output shaft 18.

FIG. 5 shows an alternative construction of a vane member 100 for use in the present motor, wherein two relieved portions 102 and 104 are defined in one side thereof instead of the singular relieved portion previously described. The provision of the two relieved portions has been found to be advantageous in providing uniform distribution of pressurized air into the three-lobed portions of the chamber 22.

The casing 12 is preferably made from aluminum and provided with a hard anodized finish. The rotor 16 is preferably constructed from stainless steel and heat treated. The vane members utilized in the present invention are preferably made from a suitable plastic material, such as acetal resin of composition ($-OCH_2-$) derived from polymerization of formaldehyde and sold under the trademark "Delrin".

In order to control the flow of air to the present motor, a valve comprising a plunger 106 and a suitable O-ring seal 107 is slidably disposed in a bore 108 which extends radially through the casing 12. Bore 108 intersects with a reduced diameter end portion 109 of the central bore 20 at a chamber 110. A bore 112 also extends through casing 12 to open into the other end of the chamber 110 and to form an annular valve seating shoulder 113. A plug 114 is threadedly received in bore 112 to prevent the escape of air therethrough. As shown in FIGS. 1 and 6, a resilient valve washer 116 is loosely connected by a suitable screw 118 to an end of plunger 106. Screw 118 extends outwardly from the end of plunger 106 for a distance so that valve washer 116 may move into or out of contact with the end portion of plunger 106. Plunger 106 also includes a reduced diameter portion 120 which is disposed generally in the region of chamber 110. A venting channel 121 is formed across the end of plunger 106. A counterbore 122 is defined in the rearmost end of the casing 12 and opens through a port 123 into chamber 110. A larger diameter counterbore 124 opens from counterbore 122.

A circular surface 125 is formed between the counterbores 122 and 124 to receive a portion of a ball-like rear element 126 of the air hose connector member 14. Element 126 is held in place inside counterbore 124 by a suitable washer 128 and retainer snap ring 130. An O-ring 132 is disposed about the ball-like portion 126 in order to prevent leakage of air. An opening 133 is defined through member 14 and the end of member 14 is provided with ridged portions 134 to allow attachment thereto of a suitable air hose. Member 14 may thus be pivoted with respect to the casing 12 to allow free usage of the present motor 10 in inconvenient working locations. A wire strainer 136 may be disposed in counterbore 122 to strain out impurities in the pressurized air.

To operate air motor 10, a suitable supply of pressurized air is connected to member 14 and plunger 106 is manually depressed to the position illustrated in FIG. 1. Air under pressure is provided through the opening 133 in member 14 to the counterbore 122. The air will then pass through the port 123 into chamber 110, and from thence into the central bore 20 to drive rotor 16 in the manner previously described. The pressurized air passes behind valve washer 116 and provides a force tending to move the plunger 106 radially outwardly. Consequently, manual depression of the plunger 106 is required throughout operation of the device.

Whenever it is desired to stop the operation of the rotor 16, the manual force on plunger 106 is reduced and the plunger 106 is allowed to travel radially outwardly due to the force of air behind valve washer 116. Valve washer 116 is then moved along with the head of screw 118 to firmly abut shoulder 113 and to obstruct port 123. The flow of air through the central bore 20 is thus completely stopped and the rotation of rotor 16 is interrupted.

The loose attachment of valve washer 116 to screw 118, best shown in FIG. 6, allows an intermediate speed or operation of the present air motor, in addition to reducing the amount of manual force necessary to depress plunger 106. When the flow of air is completely stopped and valve washer 116 is firmly abutted against shoulder 113, initial depression of plunger 106 only moves the screw 118 radially inwardly. The relatively small area of the head of screw 118 will allow ease of depression although substantial air pressure exists against the vale washer 116 in the bore 112.

Air under pressure will then pass through the small annular opening between screw 118 and valve washer 116 to operate the air motor at an intermediate speed. Air will continue to pass between the annular opening between the screw 118 and valve washer 116, and through venting channel 121, even when the end of plunger 106 abuts valve washer 116 as shown in FIG. 6. Upon further manual depression of plunger 106, valve washer 116 will be unseated from shoulder 113, as shown in FIG. 1, to allow a greater amount of air under pressure to flow to the air motor. The present valve construction thus enables a dual speed operation of the air motor, in addition to a deenergized condition.

The present device thus provides a very lightweight, yet efficient and powerful rotary air motor which is convenient for use with such tools as power wrenches and the like. The positive drive provided simultaneously on three rotor vanes according to the present invention reduces stalling of the air motor and increases the rotative power without increasing the weight thereof. The present motor is constructed from a minimum of parts and has been found to be durable over an extended period of use under a variety of different conditions.

Whereas the present specification has been described in considerable detail with respect to a preferred embodiment, it is to be understood that this description is merely for purposes of illustration and that changes or variations in the described embodiment may be made by persons skilled in the art without departing from the true scope and spirit of this invention as is solely defined in the appended claims.

What I claim is:

1. An air motor valve for regulating the passage of compressed air through an elongated passageway extending through an air motor housing comprising:
   a fluid inlet counterbore in one end of said housing and having a port laterally offset from the axis of said passageway,
   a circular chamber extending through a side of said housing and providing communication between said port and said passageway,
   a manually slidable plunger having an end portion disposed in said chamber and having a portion of reduced diameter adapted to be moved adjacent the end of said passageway,
   a venting channel defined across the face of said end portion,
   a screw member having a head at the end thereof rigidly connected to and extending from said plunger end portion, and
   a resilient valve washer disc having an aperture in the center thereof of a diameter less than the diameter of said screw member head, said washer disc loosely encircling said screw member and movable along the length thereof between the end of said plunger and said head, whereby two different amounts of air may be selectively allowed to pass through said passageway in order to operate said air motor at two different speeds or wherein the passage of air may be completely blocked in dependency on the relative position of said plunger and said valve washer disc.